(12) United States Patent
Kiss

(10) Patent No.: US 6,804,643 B1
(45) Date of Patent: Oct. 12, 2004

(54) SPEECH RECOGNITION

(75) Inventor: Imre Kiss, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 420 days.

(21) Appl. No.: 09/698,805

(22) Filed: Oct. 27, 2000

(30) Foreign Application Priority Data

Oct. 29, 1999 (FI) .............................................. 19992351

(51) Int. Cl.⁷ .............................................. G10L 15/00
(52) U.S. Cl. ........................................ 704/234; 704/235
(58) Field of Search ................................. 704/243, 234, 704/235, 246, 261

(56) References Cited

U.S. PATENT DOCUMENTS

| | | | | |
|---|---|---|---|---|
| 5,692,103 A | * | 11/1997 | Lockwood et al. | 704/243 |
| 5,737,485 A | | 4/1998 | Flanagan et al. | 395/2.41 |
| 6,070,140 A | * | 5/2000 | Tran | 704/275 |
| 6,173,258 B1 | * | 1/2001 | Menendez-Pidal et al. | 704/233 |
| 6,381,571 B1 | * | 4/2002 | Gong et al. | 704/233 |

FOREIGN PATENT DOCUMENTS

| | | |
|---|---|---|
| EP | 0969692 A1 | 1/2000 |
| WO | WO 94/22132 | 9/1994 |
| WO | WO 98/39946 | 9/1998 |

OTHER PUBLICATIONS

"Subband–Based Speech Recognition", Bourland et al., Acoustics, Speech, and Signal Processing, 1997, pp. 1251–1254.

"Multi–Resolution Cepstral Features for Phoneme Recognition Across Speech Sub–Bands", McCourt et al., Acoustics, Speech and Signal Processing, 1998, pp. 557–560.

"Towards ASR on Partially Corrupted Speech", Hennansky et al., Spoken Language, 1996, pp. 462–465.

"Quantization of Cepstral Parameters for Speech Recognition Over the World Wide Web". Digalakis et al., Selected Areas in Communications, IEEE Journal, 1999, pp. 82–90.

* cited by examiner

Primary Examiner—Daniel Abebe
(74) Attorney, Agent, or Firm—Perman & Green, LLP

(57) ABSTRACT

A speech recognition feature extractor for extracting speech features from a speech signal, comprising: a time-to-frequency domain transformer (FFT) for generating spectral magnitude values in the frequency domain from the speech signal; a frequency domain filtering block (Mel) for generating a sub-band value relating to spectral magnitude values of a certain frequency sub-band; a compression block (LOG) for compressing said sub-band values; a transformation block (DCT) for obtaining a set of de-correlated features from the compressed sub-band values; and normalising block (CN) for normalising de-correlated features.

10 Claims, 3 Drawing Sheets

SPEECH RECOGNITION

FIELD OF THE INVENTION

This invention relates to speech recognition.

BACKGROUND OF THE INVENTION

Prior-art speech recognition systems consist of two main parts: a feature extraction (or front-end) stage and a pattern matching (or back-end) stage. The front-end effectively extracts speech parameters (typically referred to as features) relevant for recognition of a speech signal. The back-end receives these features and performs the actual recognition. In addition to reducing the amount of redundancy of the speech signal, it is also very important for the front-end to mitigate the effect of environmental factors, such as noise and/or factors specific to the terminal and acoustic environment.

The task of the feature extraction front-end is to convert a realtime speech signal into a parametric representation in such a way that the most important information is extracted from the speech signal. The back-end is typically based on a Hidden Markov Model (HMM), a statistical model that adapts to speech in such a way that the probable words or phonemes are recognised from a set of parameters corresponding to distinct states of speech. The speech features provide these parameters.

It is possible to distribute the speech recognition operation so that the front-end and the back-end are separate from each other, for example the front-end may reside in a mobile telephone and the back-end may be elsewhere and connected to a mobile telephone network. Naturally, speech features extracted by a front-end can be used in a device comprising both the front-end and the back-end. The objective is that the extracted feature vectors are robust to distortions caused by background noise, non-ideal equipment used to capture the speech signal and a communications channel if distributed speech recognition is used.

Speech recognition of a captured speech signal typically begins with analogue-to-digital-conversion, pre-emphasis and segmentation of a time-domain electrical speech signal. Pre-emphasis emphasises the amplitude of the speech signal at such frequencies in which the amplitude is usually smaller. Segmentation segments the signal into frames, each representing a short time period, usually 20 to 30 milliseconds. The frames are either temporally overlapping or non-overlapping. The speech features are generated using these frames, often in the form of Mel-Frequency Cepstral Coefficients (MFCCs).

MFCCs may provide good speech recognition accuracy in situations where there is little or no background noise, but performance drops significantly in the presence of only moderate levels of noise. Several techniques exist to improve the noise robustness of speech recognition front-ends that employ the MFCC approach. So-called cepstral domain parameter normalisation (CN) is one of the most effective techniques known to date. Methods falling into this class attempt to normalise the extracted features in such a way that certain desirable statistical properties in the cepstral domain are achieved over the entire input utterance, for example zero mean, or zero mean and unity variance.

FIG. 1 is a drawing taken from WO 94/22132 showing the structure of a typical MFCC front-end. A digitised speech signal is pre-emphasised (PE), and then framed into overlapping segments (Fr). In each frame the signal is multiplied by a window function (W). This may be, for example a Hamming window function. Next, a Fast Fourier Transform (FFT) is applied, resulting in a spectral representation of the speech spectrum of the speech signal, that is a set of spectral magnitude values in the frequency domain. The spectral representation is further processed by a filter-bank (Mel) which models the characteristics of the human auditory system (Mel-filtering). This results in a set of sub-band values. Each sub-band value represents spectral magnitude values of a certain frequency sub-band of the frequency domain speech spectrum. Mel filtering also removes a considerable amount of redundant information from the signal. Non-linear compression, typically implemented by taking the logarithm of the sub-band values, is used to create a balance between high and low amplitude components. This step models the sensitivity function of the human auditory system. Logarithm computation generates a log-spectral signal comprising logarithms of sub-band values. The log-spectral signal is then de-correlated by applying a discrete cosine transform DCT. The DCT process applied to the log-spectral sub-band values produces the MFCCs. The number of MFCCs is typically smaller than the number of sub-band value logarithms. These components are further processed in a normalisation block (CN) in order to improve the noise robustness of speech recognition that is eventually carried out in the back-end.

Mean removal is an optional processing step that may be applied to reduce some slowly changing parts of the speech signal. This is based on the idea that slow variations do not carry linguistic information but are rather attributed to environmental factors. It can be demonstrated that under certain circumstances mean removal may actually lead to a reduction in speech recognition accuracy.

The present invention introduces a concept that speech recognition accuracy may actually be improved by performing a mean emphasis instead of mean removal in combination with cepstral domain parameter normalisation.

SUMMARY OF THE INVENTION

According to a first aspect of the invention there is provided a speech recognition feature extractor for extracting speech features from a speech signal, comprising:
  a time-to-frequency domain transformer for generating spectral magnitude values in the frequency domain from the speech signal;
  a frequency domain filtering block for generating a sub-band value relating to spectral magnitude values of a certain frequency sub-band, for each of a group of frequency sub-bands;
  a compression block for compressing said sub-band values; and
  a transformation block for obtaining a set of de-correlated features from the sub-band values;
  a normalising block for normalising features; characterised by said feature extractor comprising:
  a mean emphasising block for emphasising at least one of the sub-band values after frequency domain filtering.

Preferably, all the sub-band values are mean emphasised. Alternatively, some of the sub-band values are mean emphasised.

Preferably, the compression block is a non-linear compression block. Preferably, non-linear compression is performed using a logarithmic function.

Preferably, the transformation block is a linear transformation block. Preferably, the linear transformation is performed using a discrete cosine transform (DCT).

Preferably, said frequency domain filtering block is arranged to generate sub-band values according to a scale based on an auditory model (auditory based scale).

Preferably, said feature extractor comprises a differentiation block for generation of first time derivatives and second time derivatives for each of said de-correlated features; and said normalising block is arranged to generate normalised speech features using said de-correlated features, said first derivatives features, and said second derivatives.

Preferably, said mean emphasising block is arranged to add a mean estimate term to each sub-band value that is to be mean emphasised. Preferably, the mean estimate term is calculated from compressed sub-band values representing a series of at least two subsequent speech frames.

According to a second aspect of the invention there is provided a mobile station comprising a speech recognition feature extractor for extracting speech features from a speech signal, said extractor comprising:

a time-to-frequency domain transformer for generating from the speech signal spectral magnitude values in the frequency domain;

a frequency domain filtering block for generating a sub-band value relating to spectral magnitude values of a certain frequency sub-band, for each of a group of frequency sub-bands;

a compression block for compressing said sub-band values;

a transformation block for obtaining a set of de-correlated features from the sub-band values; and a normalising block for normalising features; characterised by said feature extractor comprising a mean emphasising block for emphasising at least one of the sub-band values after frequency domain filtering.

Preferably, the compression block is a non-linear compression block. Preferably, non-linear compression is performed using a logarithmic function.

Preferably, the transformation block is a linear transformation block. Preferably, the linear transformation is performed using a discrete cosine transform (DCT).

According to a third aspect of the invention there is provided a method for extracting speech features from a speech signal, comprising the steps of:

generating spectral magnitude values in the frequency domain from the speech signal;

generating a sub-band value relating to spectral magnitude values of a certain frequency sub-band, for each of a group of frequency sub-bands;

compressing said sub-band values by applying compression to each sub-band value;

obtaining a set of de-correlated features from the sub-band values; and normalising features; characterised by said method comprising the steps of:

emphasising at least one of the sub-band values after frequency domain filtering.

According to a fourth aspect of the invention there is provided a computer program for extracting speech features from a speech signal, comprising:

a computer readable program means for causing a computer to generate spectral magnitude values in the frequency domain from the speech signal;

a computer readable program means for causing a computer to generate a sub-band value relating to spectral magnitude values of a certain frequency sub-band, for each of a group of frequency sub-bands;

a computer readable program means for causing a computer to compress said sub-band values;

a computer readable program means for causing a computer to obtain a set of de-correlated features from the sub-band values;

a computer readable program means for causing a computer to normalise features; characterised by said computer program product comprising:

a computer readable program means for causing a computer to emphasise at least one of the sub-band values after frequency domain filtering.

BRIEF DESCRIPTION OF THE DRAWINGS

The invention will now be described, by way of example only, with reference to the accompanying drawings, in which.

DETAILED DESCRIPTION

Figure 1:
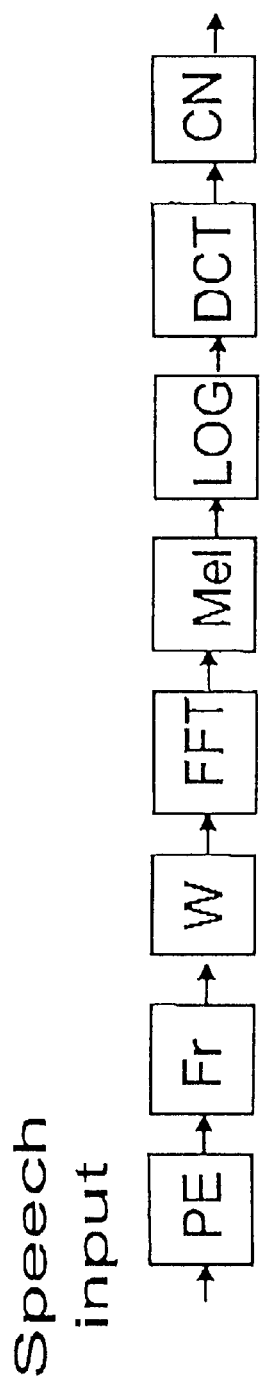
FIG. 1 shows a functional block diagram of a speech recognition front-end according to prior art.

FIG. 1 showing a functional block diagram of an MFCC generator according to WO94/22132 has already been described in the foregoing.

Figure 2:
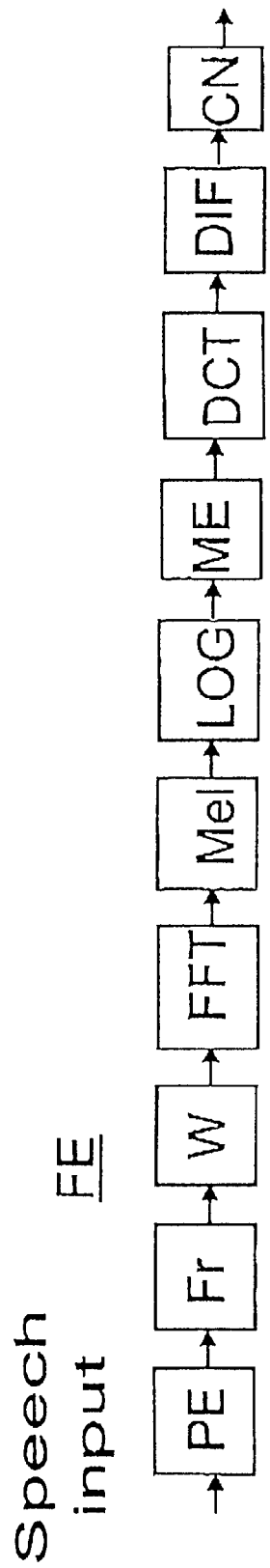
FIG. 2 shows a functional block diagram of a speech recognition front-end according to one embodiment of the invention.

FIG. 2 shows a functional block diagram of a speech recognition front-end according to one embodiment of the invention. In this embodiment, mean emphasising is used in generation of all the speech features. In another embodiment mean emphasising is used only in generation of some of the speech features.

In FIG. 2 the block diagram starts from a point where a speech signal is digitised (not shown). The blocks of the block diagram are, in sequential order:

PE pre-emphasising the speech signal,

Fr framing the signal into overlapping frames,

W windowing, that is multiplication by a window function,

FFT time-to-frequency domain transformation to produce frequency domain magnitude values, Mel auditory based filtering of frequency domain magnitude values to produce sub-band values according to an auditory based scale, the sub-band values describing energies at certain frequency sub-bands of the auditory based frequency scale, LOG non-linear transformation of sub-band values, ME mean emphasising of sub-band values, DCT de-correlating the mean emphasised sub-band values, CN normalisation of de-correlated sub-band values.

In an alternative embodiment the order of the LOG and ME blocks is reversed.

In an embodiment of the invention, the front-end comprises an offset compensation block between the pre-emphasis block and the windowing block.

The offset compensation block removes any DC offset from the digitised speech input signal $S_{in}$ producing a substantially offset-free input signal $s_{of}$. This is carried out according to the equation:

$$s_{of}(n) = s_{in}(n-1) + 0.999 \cdot s_{of}(n-b\ 1) \quad (1)$$

The substantially offset-free input signal $s_{of}$ is segmented into overlapping frames of N samples. The difference (shift interval) between the starting points of consecutive frames is M samples. The parameter M defines the number of frames per unit time.

The specific values of N and M depend on the sampling rate, as shown in Table I. The frame length is 25 ms for 8 and 16 kHz sampling rates, and 23.27 ms for a sampling rate of 11 kHz.

TABLE I

Values of frame length N and frame shift interval M according to different sampling rates.

| Sampling rate (kHz) | $f_{s3} = 16$ | $f_{s2} = 11$ | $f_{s1} = 8$ |
|---|---|---|---|
| Frame length N (samples) | 400 | 256 | 200 |
| Shift interval M (samples) | 160 | 110 | 80 |

The framed offset-free input signal is pre-emphasised in the pre-emphasis block PE according to the following equation:

$$s_{pe}(n) = s_{of}(n) - 0.97 \cdot s_{of}(n-1) \quad (2)$$

where $s_{of}$ and $s_{pe}$ are the input and output of the pre-emphasis block, respectively.

The output of the pre-emphasis block is windowed by a Hamming window of length N defined as follows:

$$s_w(n) = \left\{ 0.54 - 0.46 \cdot \cos\left(\frac{2\pi(n-1)}{N-1}\right) \right\} \cdot s_{pe}(n), \ 1 \le n \le N \quad (3)$$

where N is the frame length and $s_{pe}$ and $s_w$ are the input and output of the windowing block W, respectively.

Each frame of N samples is zero padded to form an extended frame of 256 samples for the 8 and 11 kHz sampling rates, and 512 samples if the sampling rate is 16 kHz. In the FFT block a Fast Fourier transform of length 256 or 512, respectively, is applied to compute the magnitude spectrum of the signal:

$$bin_k = \left| \sum_{n=0}^{FFTL-1} s_w(n) e^{-jnk\frac{2\pi}{FFTL}} \right|, k = 0, \ldots, FFTL-1, \quad (4)$$

where $s_w(n)$ is the input to the FFT block, FFTL is the length of the Fast Fourier Transform performed in the FFT block (256 or 512 samples), and $bin_k$ is the absolute value of the resulting complex vector for frequency bin k. Due to symmetry, only bins $bin_0$ to $bin_{FFTL/2}$ are required and thus used for further processing.

After the FFT block a Mel-filter is used to generate the sub-band values. The Mel-filter receives sets of magnitude values corresponding to Mel-scale frequency sub-bands. Then each frequency sub-band value is calculated from the corresponding magnitude values.

The low-frequency components of the magnitude spectrum are ignored to avoid low-frequency noise. Thus, the useful frequency band is chosen to lie between 64 Hz and half of the actual sampling frequency. The useful frequency band is divided into 23 channels equidistant in the Mel frequency domain. Each of the channels has a triangular-shaped frequency window and consecutive channels are half-overlapping.

The choice of the starting frequency of the filter bank, $f_{start} = 64$ Hz, roughly corresponds to the case where the full frequency band is divided into 24 channels and the first channel is discarded.

The centre frequencies of the channels in terms of FFT bin indices are calculated according to the following equations:

$$Mel\{x\} = 2595 \cdot \log_{10}\left(1 + \frac{x_1}{700}\right) \quad (5a)$$

$$f_{c_i} = Mel^{-1}\left\{Mel\{f_{start}\} + \frac{Mel\{f, 12\} - Mel\{f_{start}\}}{23+1} i\right\}, i = 1, \ldots, 23, \quad (5b)$$

$$cbin_i = round\left\{\frac{f_{c_i}}{f_s} FFTL\right\}, \quad (5c)$$

where round(.) indicates rounding towards the nearest integer and $cbin_i$ is the ith FFT index.

A weighted sum of the FFT magnitude spectrum values ($bin_i$) in each sub-band, that is the sub-band value for a given sub-band, is computed as an output of the Mel filter. Half-overlapped triangular windowing is used, $$fbank_k = \sum_{i=cbin_{k-1}}^{cbin_k} \frac{i - cbin_{k-1} + 1}{cbin_k - cbin_{k-1} + 1} bin_i + \sum_{i=cbin_{k+1}}^{cbin_{k+1}} \left(1 - \frac{i - cbin_k}{cbin_{k+1} - cbin_k + 1}\right) bin_i, \quad (6)$$

where k=1, ..., 23, $cbin_0$ and $cbin_{24}$ denote the FFT bin indices corresponding to the starting frequency and half of the sampling frequency:

$$cbin_0 = round\left\{\frac{f_{start}}{f_s} FFTL\right\}, \quad (7a)$$

$$cbin_{24} = round\left\{\frac{f_s/2}{f_s} FFTL\right\} = FFTL/2. \quad (7b)$$

In a preferred embodiment, two first channels are discarded, not just the first one.

In the non-linear transformation block LOG, a non-linear transformation is applied to the output of Mel filtering block using a natural logarithm function:

$$f_i = \ln(fbank_i), i=1, \ldots, 23 \quad (8)$$

After the non-linear transformation, mean emphasis is applied to the output of the non-linear transformation block:

$$f'_i = f_i + m_i, i=1, \ldots, 23 \quad (9)$$

where $m_i$ is a mean estimate term characterising mean of previous values of $f_i$.

The mean estimate term $m_i$ is calculated from a mean estimate $\overline{m}_i$:

$$m_i = c \cdot \overline{m}_i \quad (10),$$

where c is a weighting factor defining how large an influence mean emphasis has on the sub-band values, for example 0.5 or 1. The choice of weighting factor depends on the exact implementation of the invention and may take any value. Thus, the values 0.5 and 1, mentioned above, are provided for illustrative purposes only.

The mean estimate $\overline{m}_i$ is calculated from previous sub-band values of $f_i$:

$$\overline{m}_i(k) = A \cdot \overline{m}_i(k-1) + (1-A) \cdot f_i(k), \quad i=1,\ldots,23, \; k=1, \qquad (11),$$

where k is a speech frame index and A is a so-called "forgetting-factor".

In the preferred embodiment of the invention, the forgetting-factor A is 0,975. The higher the forgetting-factor, the smaller is the weight of the previous $f_i$ values and vice versa. The value of the forgetting-factor affects the performance of the (back-end) speech recogniser and can be varied to optimise the noise robustness of speech recognition.

The initial value of m is a mean value of a certain sub-band in a predefined number of first consecutive frames. In this embodiment, the initial mean value is calculated using the 38 first frames. In an alternative embodiment, the initial value of m is set equal to the value of a certain sub-band in the first frame, or the initial value of $m_{old}$ is a predetermined value. In alternative embodiments, the number of frames used for calculation of the initial mean estimate can be other than 38.

In this embodiment, word "mean" refers to an arithmetic average, but other forms of averaging (for example logarithmic averaging, geometric averaging, or median, mode or norm values) can be employed.

A further embodiment of the invention comprises a differentiation block DIF which calculates first time derivatives and second time derivatives for each sub-band value. This optional block is shown in dotted lines in FIG. 2.

13 cepstral coefficients are calculated from the output of the mean emphasising block ME:

$$C_i = \sum_{j=1}^{23} f_j \cdot \cos\left(\frac{\pi \cdot i}{23}(j - 0.5)\right), \; 0 \le i \le 12. \qquad (12)$$

Feature vectors are formed, comprising the 13 cepstral coefficients. In an embodiment of the invention, the feature vector additionally comprises a log-energy coefficient as a fourteenth coefficient. The log-energy coefficient is an energy measure describing the overall energy of a digitised frame of the speech signal. The logarithmic frame energy measure logE is calculated as follows:

$$\log E = \ln\left(\sum_{i=1}^{N} s_{of}(i)^2\right), \qquad (13)$$

where N is the frame length in samples and $s_{of}$ is the substantially offset-free input signal.

In a distributed speech recognition system, the feature vector is further channel encoded prior to its transmission over a communications link to the back-end where speech recognition is performed.

Figure 3:
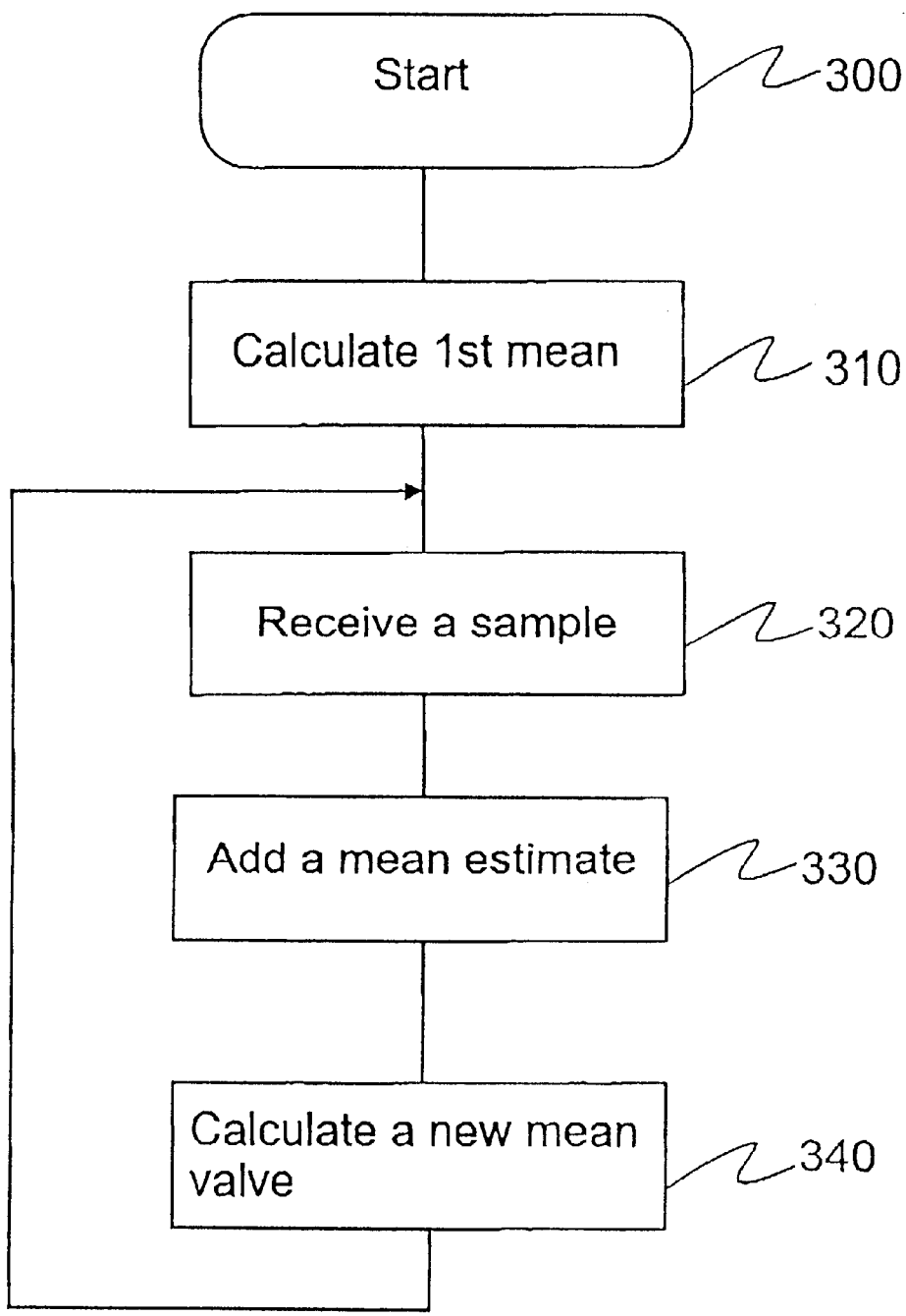
FIG. 3 shows a flow chart of a mean emphasising block according to the invention.

FIG. 3 shows a flow chart describing the operation of a mean emphasising block according to a preferred embodiment of the invention. The operation starts at step 300, when the first speech frames are captured by the front-end. In step 310, the initial mean estimate term is calculated for each sub-band value, or sample. This is done by collecting the 38 first magnitude values for each sub-band and calculating a respective mean estimate for each sub-band. During normal operation, that is after the start, one sample is received at a time in step 320. The mean estimate term is added to the sample in step 330. A new mean estimate term value is then calculated in block 340, according to equations (10) and (11).

Figure 4:
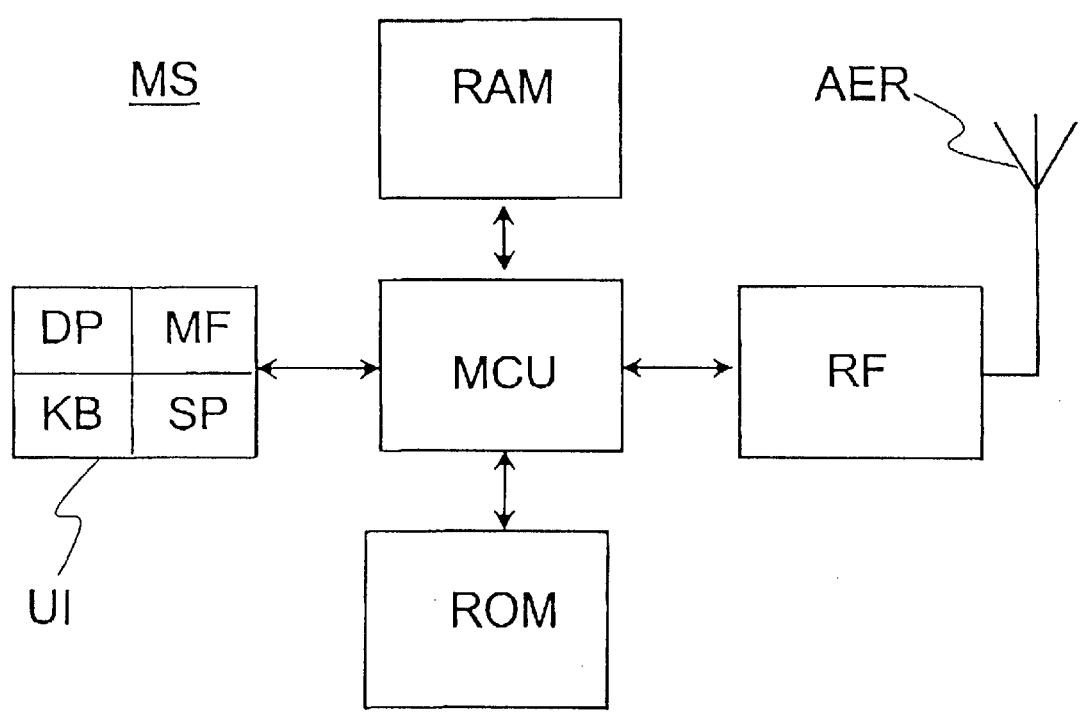
FIG. 4 shows a block diagram of a mobile station according to the invention.

FIG. 4 shows a block diagram of a mobile station MS with a front-end according to the invention. This embodiment also represents an example of a distributed speech recognition system using the invention, in which the back-end is accessible via a mobile telecommunications network. In the mobile station, a Master Control Unit MCU controls blocks responsible for the mobile station's various functions: a Random Access Memory RAM, a Radio Frequency part RF, a Read Only Memory ROM, and a User Interface UI. The user interface comprises a keyboard KB, a display DP, a speaker SP, and a microphone MF. The MCU is a microprocessor, or in alternative embodiments, some other kind of processor, for example a Digital Signal Processor. Advantageously, the MCU's operating instructions, including those necessary for speech feature extraction are stored in the mobile station in advance in the ROM memory. In accordance with its instructions, the MCU uses the RF block for transmitting and receiving data on a radio path. The MCU uses the RAM as its working memory. The MCU also performs feature extraction, when the mobile station is used as a speech-recognition front-end. In the case of a distributed speech recognition system, the MCU causes the RF block to transmit extracted speech features to a mobile telecommunications network over the radio path for further processing in a remote back-end. Advantageously, this happens in real time, speech features being transmitted to the back-end as they are extracted. Alternatively, speech features may be extracted, temporarily stored in the mobile station and then transmitted to the back end for speech recognition. In a situation where speech recognition is performed in the mobile station itself, the mobile station also comprises back-end functionality.

The practical implementation of the front-end can vary significantly within the scope of the invention. For example, it can be provided as dedicated hardware for speech recognition processing. Instead of using the MCU, a dedicated Digital Signal Processor DSP can be used. Alternatively, the front end can be implemented solely or partially by software. The software may be downloaded to the front end from a remote site. Furthermore, the operation of the front end can be optimised be adjusting its operating parameters by the back-end, regardless if the front end is implemented by hardware.

It is also possible to receive operating instructions over a communications channel, for example a radio link.

In an embodiment of the present invention, the mobile station captures speech with its microphone, extracts speech features using the MCU, RAM and ROM, and sends the features to the remote back-end using the RF block. The MS subsequently receives text converted from the features from the back-end and via its RF block and displays the received text on its display.

The performance of a speech recognition system according to the invention is now described referring to experimental results. In the experiments, no DC offset removal was used, the sampling rate was 8 kHz and the frame length was 256 samples. The multiplier in Equation (2) was 0,98 instead of 0,97. The two lowest frequency channels were discarded and 22 channels were used starting from a frequency of 115 Hz. Logarithms to base 10 were used to calculate the values of $f_i$ in equation 8 instead of natural logarithms and no logE term was used. In the experiments the speech recognition was tested using recorded speech according to ETSI STQ WI008 qualification criteria. Speech recognition performance with 50% and 100% speech emphasis (c=0,5, c=1,0), 50% and 100% speech subtraction and without any mean emphasising or subtraction under various noise levels is shown in Table II (with coefficient normalisation). Speech recognition performance was measured in terms of the accuracy of word recognition using four different noise types and seven different Signal-to-Noise Ratios SNR, and then the average result was compared with a corresponding result without mean emphasis or subtraction. The difference between the two results is presented in percentage units. To facilitate comparison, the final two tables present results for two cases where mean removal (mean subtraction) was used instead of mean emphasis.

TABLE II

Speech recognition performance measured under various conditions.

| SNR | N1, % | N2, % | N3, % | N4, % | Avg., % | Improvement, % |
|---|---|---|---|---|---|---|
| a) Baseline, multiresolution front-end, normalisation, no mean emphasis or subtraction | | | | | | |
| clean | 99.05 | 98.76 | 98.51 | 99.07 | 98.85 | — |
| 20 | 98.34 | 97.82 | 98.60 | 99.17 | 98.48 | — |
| 15 | 97.42 | 96.28 | 97.85 | 98.67 | 97.56 | — |
| 10 | 94.69 | 91.65 | 96.12 | 98.40 | 95.22 | — |
| 5 | 86.61 | 79.59 | 90.46 | 96.64 | 88.33 | — |
| 0 | 66.10 | 56.09 | 72.47 | 90.62 | 71.32 | — |
| −5 | 29.90 | 31.60 | 38.35 | 70.75 | 42.65 | — |
| b) Baseline + mean emphasis by 50% | | | | | | |
| clean | 99.23 | 98.79 | 98.72 | 99.17 | 98.98 | 0.13 |
| 20 | 98.46 | 98.34 | 98.60 | 99.17 | 98.64 | 0.16 |
| 15 | 97.61 | 96.61 | 97.79 | 98.80 | 97.70 | 0.15 |
| 10 | 94.81 | 92.32 | 96.00 | 98.33 | 95.37 | 0.15 |
| 5 | 86.71 | 80.68 | 90.64 | 96.82 | 88.71 | 0.39 |
| 0 | 67.88 | 57.09 | 73.96 | 90.99 | 72.48 | 1.16 |
| −5 | 32.82 | 32.39 | 41.07 | 72.54 | 44.71 | 2.06 |
| c) Baseline + mean emphasis by 100% | | | | | | |
| clean | 99.14 | 98.88 | 98.72 | 99.20 | 98.99 | 0.14 |
| 20 | 98.59 | 98.34 | 98.60 | 99.32 | 98.71 | 0.23 |
| 15 | 97.73 | 96.64 | 97.79 | 98.95 | 97.78 | 0.22 |
| 10 | 94.90 | 92.65 | 96.09 | 98.30 | 95.49 | 0.27 |
| 5 | 87.32 | 81.28 | 90.49 | 96.54 | 88.91 | 0.58 |
| 0 | 67.49 | 58.45 | 74.26 | 91.30 | 72.88 | 1.56 |
| −5 | 35.12 | 32.72 | 42.74 | 73.87 | 46.11 | 3.46 |
| d) Baseline + mean subtraction by 50% | | | | | | |
| clean | 98.83 | 98.49 | 98.36 | 98.77 | 98.61 | −0.23 |
| 20 | 98.16 | 97.34 | 98.30 | 99.04 | 98.21 | −0.27 |
| 15 | 97.27 | 95.55 | 97.64 | 98.73 | 97.30 | −0.26 |
| 10 | 94.26 | 90.54 | 95.74 | 98.09 | 94.66 | −0.56 |
| 5 | 85.97 | 77.87 | 89.14 | 96.48 | 87.37 | −0.96 |
| 0 | 64.05 | 55.16 | 71.37 | 89.76 | 70.09 | −1.24 |
| −5 | 28.00 | 31.63 | 36.95 | 69.79 | 41.59 | −1.06 |
| e) Baseline + mean subtraction by 100% | | | | | | |
| clean | 98.59 | 98.06 | 98.00 | 98.40 | 98.26 | −0.59 |
| 20 | 98.06 | 96.67 | 98.09 | 98.89 | 97.93 | −0.55 |
| 15 | 97.18 | 94.80 | 97.41 | 98.52 | 96.98 | −0.58 |
| 10 | 93.98 | 89.42 | 95.41 | 97.84 | 94.16 | −1.05 |
| 5 | 85.02 | 76.50 | 89.02 | 95.99 | 86.63 | −1.69 |
| 0 | 63.31 | 53.43 | 71.40 | 89.51 | 69.41 | −1.91 |
| −5 | 28.49 | 31.33 | 37.28 | 69.82 | 41.73 | −0.92 |

Table II above clearly shows that speech recognition performance improves when mean emphasis is used. The improvement is most significant in the most noisy environments, where a maximum of 3,46 percent improvement in speech recognition accuracy was achieved using 100% mean emphasis (Table II(c)). It is notable, that mean emphasis is advantageous at all noise levels and its use does not impair speech recognition accuracy under any of the four noise types.

This document presents the implementation and embodiments of the invention with the aid of examples. It is obvious to a person skilled in the art, that the invention is not restricted to details of the embodiments presented above, and that the invention can be implemented in other embodiments without deviating from the characteristics of the invention. Thus, the presented embodiments should be considered illustrative, but not restrictive. Hence, the possibilities for implementing and using the invention are only restricted by the enclosed patent claims. Consequently, the various options of implementing the invention as determined by the claims, including equivalent implementations, also belong to the scope of the present invention.

What is claimed is:

1. A speech recognition feature extractor for extracting speech features from a speech signal, comprising: a time-to-frequency domain transformer for generating spectral magnitude values in the frequency domain from the speech signal;
    a frequency domain filtering block for generating a sub-band value relating to spectral magnitude values of a certain frequency sub-band, for each of a group of frequency sub-bands;
    a compression block for compressing said sub-band values;
    a transformat on block for obtaining a set of de-correlated features from the sub-band values; and
    a normalising block for normalizing features;
    said feature extractor comprising a mean emphasising block for emphasizing at least one of the sub-band values after frequency domain filtering, wherein the emphasising is accomplished by addition of a mean value of sub-band signals to said at least one of the sub-band values.

2. A speech recognition feature extractor according to claim 1, wherein the mean emphasising block is arranged to mean emphasise all the sub-band values.

3. A speech recognition feature extractor according to claim 1, wherein the mean emphasising block is arranged to mean emphasise some of the sub-band values.

4. A speech recognition feature extractor according to claim 1, wherein said frequency domain filtering block is arranged to generate sub-band values according to a scale based on an auditory model.

5. A speech recognition feature extractor according to claim 1, comprising a differentiation block for generation of first time derivatives and second time derivatives for each of said de-correlated features; and wherein
    said normalising block is arranged to generate normalised speech features using said de-correlated features, said first derivatives features, and said second derivatives.

6. A speech recognition feature extractor according to claim 1, wherein, in said addition of the mean value, said mean emphasising block is arranged to add a mean estimate term to each sub-band value that is to be mean emphasised.

7. A speech recognition feature extractor according to claim 6, wherein the mean emphasising block is arranged to calculate the mean estimate term from compressed sub-band values representing a series of at least two subsequent speech frames.

8. A mobile station comprising a speech recognition feature extractor for extracting speech features from a speech signal, said extractor comprising:
    a time-to-frequency domain transformer for generating spectral magnitude values in the frequency domain from the speech signal;
    a frequency domain filtering block for generating a sub-band value relating to spectral magnitude values of a certain frequency sub-band, for each of a group of frequency sub-bands;
    a compression block for compressing said sub-band values; a transformation block for obtaining a set of de-correlated features from the sub-band values; and a normalising block for normalising features;

said feature extractor comprising a mean emphasising block for emphasising; at least one of the sub-band values after frequency domain filtering, wherein the emphasising is accomplished by addition of a mean value of sub-band signals to said at least one of the sub-band values.

9. A method for extracting speech features from a speech signal, comprising the steps of:

generating spectral magnitude values in the frequency domain from the speech signal;

generating a sub-band value relating to spectral magnitude, values of a certain frequency sub-band;

compressing said sub-band values; obtaining a set of de-correlated features from the sub-band values; normalising features; and emphasising at least one of the sub-band values after frequency domain filtering, wherein the emphasising is accomplished by addition of a mean value of sub-band signals to said at least one of the sub-band values.

10. A computer program for extracting speech features from a speech signal, comprising:

a computer readable program means for causing a computer to generate spectral magnitude values in the frequency domain from the speech signal;

a computer readable program means for causing a computer to generate a sub-band value relating to spectral magnitude values of a certain frequency sub-band, for each of a group of frequency sub-bands;

a computer readable program means for causing a computer to compress said sub-band values;

a computer readable program means for causing a computer to obtain a skit of de-correlated features from the sub-band values;

a computer readable program means for causing a computer to normalise features; and a computer readable mean-emphasising program means for causing a computer to emphasise at least one of the sub-band values after frequency domain filtering, wherein emphasising is accomplisher by addition of a mean value of sub-band signals to said at least one of the sub-band values.

* * * * *